(12) United States Patent
Lindell

(10) Patent No.: US 6,622,056 B1
(45) Date of Patent: Sep. 16, 2003

(54) METHOD AND SYSTEM FOR SUPPLY CHAIN OR SUPPLY NETWORK CONTROL

(76) Inventor: Johan Lindell, 131, 216 18, Malmö (SE)

( * ) Notice: Subject to any disclaimer, the term of this patent is extended or adjusted under 35 U.S.C. 154(b) by 277 days.

(21) Appl. No.: 09/715,932

(22) Filed: Nov. 17, 2000

(51) Int. Cl.$^7$ .......................... G06F 17/60; G06F 19/00
(52) U.S. Cl. ............................. 700/106; 700/99; 705/8
(58) Field of Search .................... 700/99, 106, 281, 700/282; 705/8

(56) References Cited

U.S. PATENT DOCUMENTS

| | | | | |
|---|---|---|---|---|
| 4,386,623 A | * | 6/1983 | Funk et al. ..................... | 137/2 |
| 4,642,766 A | * | 2/1987 | Funk et al. ..................... | 705/7 |
| 4,736,329 A | * | 4/1988 | Ferretti et al. ............... | 700/281 |
| 4,782,451 A | * | 11/1988 | Mazzarella et al. ......... | 700/281 |
| 5,519,638 A | * | 5/1996 | Tiao ............................ | 700/281 |
| 5,946,662 A | * | 8/1999 | Ettl et al. ...................... | 705/8 |
| 6,151,582 A | * | 11/2000 | Huang et al. ................. | 705/8 |

* cited by examiner

Primary Examiner—Albert W. Paladini
Assistant Examiner—Elliot Frank
(74) Attorney, Agent, or Firm—Edward J. Chalfie; Arnstein & Lehr LLP

(57) ABSTRACT

A method and system for determining a filtrate ($FQ_{CL}$) for a product on a current level in a supply chain or network A market tank balance ($MTB_{CL}$) is determined for the product in the supply chain

- the filtrate quantity for the product is determined by calculating the difference between the market tank balance ($MTB_{CL}$) and a preferred balance ($PB_{CL}$) of products in the market tank, and
- if the filtrate quantity is lower than a predetermined threshold, the filtrate quantity is increased on the current level by increasing the delivery of the product to the market tank, or increasing the production, or decreasing the delivery of the product from the market tank.

If the filtrate quantity is higher than a predetermined threshold, the filtrate quantiy is reduced by reducing the delivery of the product to the market tank, or by reducing the production, or by increasing the outflow from the market tank.

20 Claims, 7 Drawing Sheets

Table 1

| | |
|---|---|
| Market Tank Leadtime Balance on the current level ($MTLB_{CL}$) | $= \sum (S_{suppl} * IDLT_{CL}) * PTO_{CL} + \sum MTLB_{CUST}$ |
| Market Tank Leadtime Time on the current level ($MTLT_{CL}$) | $= MTLB_{CL} / MTOF_{CL}$ |
| Market Tank Balance on the current level ($MTB_{CL}$) | $= PTB_{CL} + IQ_{CL} + \sum MTB_{CUST}$ |
| Market Tank Outflow on the current level ($MTOF_{CL}$) | 1. $= \sum MTOF_{cust}$<br>2. $= \max(\sum MTOF_{CL}; \sum PTO_{CL})$ |
| Market Time Duration ($MTD_{CL}$) | $= MTB_{CL} / MTOF_{CL}$ |
| Market Tank Max Balance on the current level ($MTMB_{CL}$) | $= \min(PTMT_{CL} * PTO_{CL}; PTMB_{CL}) + \sum MTMB_{CUST}$ |
| Market Tank Max Time (MTMT) | $= MTMB_{CL} / MTOF_{CL}$ |
| Market Tank Safety Balance on the current level ($MTSB_{CL}$) | $= \max(PTST_{CL} * PTO_{CL}; PTSB_{CL}) + \sum MTSB_{CUST}$ |
| Market Tank Safety Time on the current level ($MTST_{CL}$) | $= MTSB_{CL} / MTOF_{CL}$ |
| Preferred Balance on the current level ($PB_{CL}$) | $= (MTMB_{CL} + MTSB_{CL}) / 2 + MTLB_{CL}$, or<br>$= MTARQ_{CL} / 2 + MTSB_{CL} + MTLB_{CL}$, |
| Preferred Time on the current level ($PT_{CL}$) | $= PB_{CL} / MTOF_{CL}$ |
| Fillrate in % on the current level | $= (MTD_{CL} - PT_{CL}) * 2 / (MTMT_{CL} - MTST_{CL}) + 100\%$, or<br>$= (MTD_{CL} - PT_{CL}) / (MTARQ_{CL}/2) + 100\%$ |
| Fillrate Quantity on the current level ($FQ_{CL}$) | $= MTB_{CL} - PB_{CL}$ |
| Fillrate Time on the current level ($FT_{CL}$) | $= MTD_{CL} - PT_{CL}$ |
| Market Tank Average Repl. Quantity ($MTARQ_{CL}$) | $= PTARQ_{CL} + \sum MTARQ_{CUST}$ |
| Product Tank Outflow (PTO) | |
| Product Tank Safety Time (PTST) | |
| Product Tank Max Time (PTMT) | |
| Product Tank Average Repl. Quantity (PTARQ) | |

METHOD AND SYSTEM FOR SUPPLY CHAIN OR SUPPLY NETWORK CONTROL

FIELD OF THE INVENTION

The present invention relates to a method and system for supply chain or supply network control, and more particularly to a method and system for determining and controlling the fillrate in a supply chain or supply network for controlling the flow and balance of goods from point of origin to a point of consumption.

DESCRIPTION OF THE PRIOR ART

In a supply chain or network, raw material, products and components etc. are moved between nodes in the chain during the production process, and due to costs associated with holding inventories including storage costs, obsolescence etc., an inventory replenishment system is required for obtaining small resupply deliveries to be made just as they are needed.

Further, an efficient logistics control and production scheduling and an equalised flow from a source to a destination in a supply chain are desired in order to balance demand for products with plant capacity and availability of inputs. Inbound materials and components must be scheduled to fit into the production process. The production process itself is scheduled to fulfill existing and planned orders. Manufactured products must be scheduled for shipment to wholesalers, retailers, and customers. For example, if the firm is running a special advertising campaign to promote its product, the additional products must be available for sale. Depending on these variations in product demand it is difficult to obtain an efficient production scheduling to fulfill the order requirements of the end customers.

In prior art systems for supply chain control, different activities are linked by communication in order to co-ordinate and managing logistics. A customer buys merchandise in a store having a scanner at the checkout counter linked directly to the chain's wholesaler so that it has instantaneous information as to what is being sold. Thus, the store can be restocked when necessary rather than having a large inventory at the store. In the next step the wholesaler orders merchandise from a producer based on information collected from its stores. However, the supplier or producer does not know about the real demands from the stores, just a total demand from each store associated with that wholesaler. Several wholesalers of different chain stores may order from the same producer.

For example, two stores associated with a first wholesaler may have uniform demands from customers over the time for a particular product but on different levels. A second wholesaler has two other associated stores also having uniform demands from its customers over the time for that particular product but on other levels. Each shop needs a particular quantity of products within a time interval. The quantity and/or the time interval can be different for each shop. Information about the demands from each shop is received at its wholesaler. A predetermined order quantity is used when the wholesalers order products from the producer within a time interval. As for the shops the time interval as well as the order quantity may differ between the different wholesalers. Thus, even if the demands from the customers are almost uniform over the time the producer receives orders, which vary sometimes very much. It is, therefore, difficult to obtain an efficient logistics control and production scheduling and an equalised flow from a source to a destination in a supply chain.

In order to improve the production planning and flow of products ect in a supply chain, demand forecasting has been used. Information concerning delivery of products to customers and receipt of raw materials or components at a producer for production are relevant in order to make good decisions. Further, customers' orders are needed for production control and scheduling, and for co-ordinating and managing logistics. However, demand forecasting is a time consuming, expensive and cumbersome process.

U.S. Pat. No. 5,953,707 discloses a system for supporting management decisions associated with manufacturing of service supply chains, allowing various decision makers in the supply chain to view the supply chain from their own perspective, and understand the effect that their decisions will have on the supply chain. The decision support system provide a server side including a decision support system database that interfaces with model engines that perform analytical processes on data to determine requirements and make projections. A client side is also provided, which includes decision support frames that present the various view points available in the system to the users.

Although various decision makers in the supply chain can view the supply chain from their own perspective, i.e only separate parts of the supply chain status are shown. Thus, the possibility of obtaining an efficient logistics control, production scheduling and an equalised flow from a source to a destination in a supply chain are delimited, because the basis of a decision comprises only parts of information about the status of the supply chain.

SUMMARY OF THE INVENTION

It is an object of the present invention to provide an improved method and system for supply chain or supply network control, in order to obtain efficient flow and balance of goods from point of origin to a point of consumption.

This is accomplished by the method and system for determining and controlling the fillrate in a supply chain or supply network according to the invention, wherein a market tank balance ($MTB_{CL}$) is determined for the product in said supply chain or network; the filtrate quantity for the product in the supply chain or network is determined by calculating the difference between the market tank balance ($MTB_{CL}$) and a preferred balance ($PB_{CL}$) of products in the market tank; and if the fillrate quantity is lower than a predetermined threshold, the fillrate quantity is increased o n the current level by in creasing the delivery amount of said product to the market tank on the level; or if the fillrate quantity is higher than a predetermined threshold, the fillrate quantity is reduced on said particular level by reducing the delivery amount of said product to the market tank on the current level or increasing the outflow of said product to a market tank for the product on a customer level.

Further, by measuring the fillrate in a supply chain or network allows any n ode in the supply network full downstream transparency, i.e. a change of the fillrate in the lowest level in the network is apparent immediately on all levels upstream in the network.

An advantage of the method and system for determining and controlling the fillrate in a supply chain is that if the fillrate is determined to be low in the supply chain, a producer can take a decision of producing more such products. In another case, the filtrate is determined to be high for a particular product in the supply chain and the producer can take a decision of decreasing the production of that particular product for increasing the production capacity for another product.

BRIEF DESCRIPTION OF THE DRAWINGS

In order to explain the invention in more detail and the advantages and features of the invention a preferred embodiment will be described in detail below, reference being made to the accompanying drawings, in which.

DETAILED DESCRIPTION OF THE INVENTION

The present invention relates to a method and system for determining and controlling the fillrate of a product and/or different products in a supply chain or supply network for controlling the flow and balance of goods from point of origin to a point of consumption.

Figure 1:
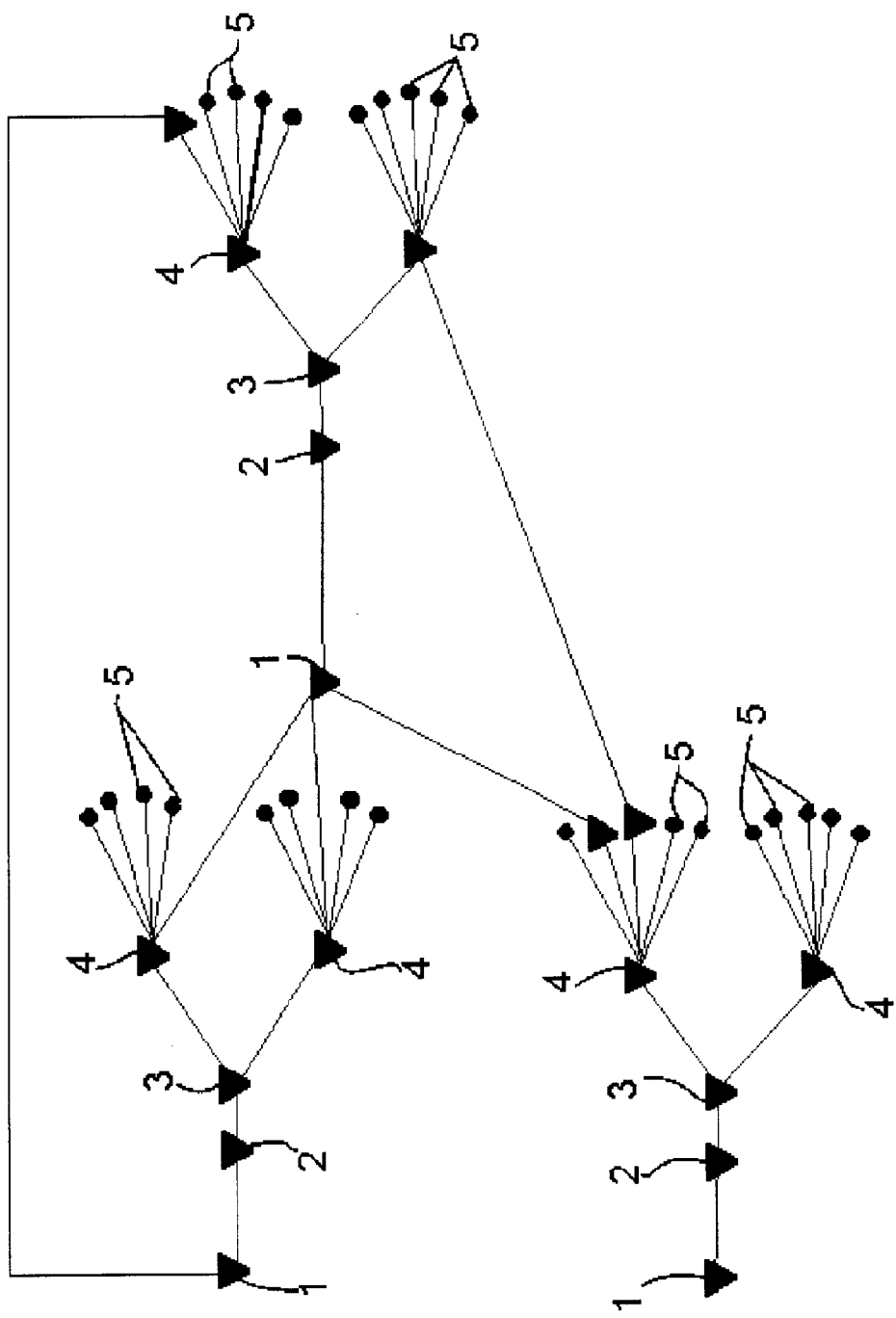
FIG. 1 is an illustrative view of an example of a supply network.

With reference to FIG. 1, the path from the point of origin to the point of consumption of goods in a supply chain or supply network comprises several nodes. FIG. 1 shows an example of a supply network comprising suppliers 1, which deliver goods to producers 2, which manufacture products and deliver the products to wholesalers 3. Further, the wholesalers 3 delivers the products to distributors 4, which deliver products to other distributors 4 or shops 5, from which customers buys the products. Consequently, a distributor 4 operates as a supplier for a shop 5, as a customer to a wholesaler 3 and as a customer's customer to a producer 2. There are of course other possible supplier to customer to customer's customer relations in a supply chain or network.

Figure 2:
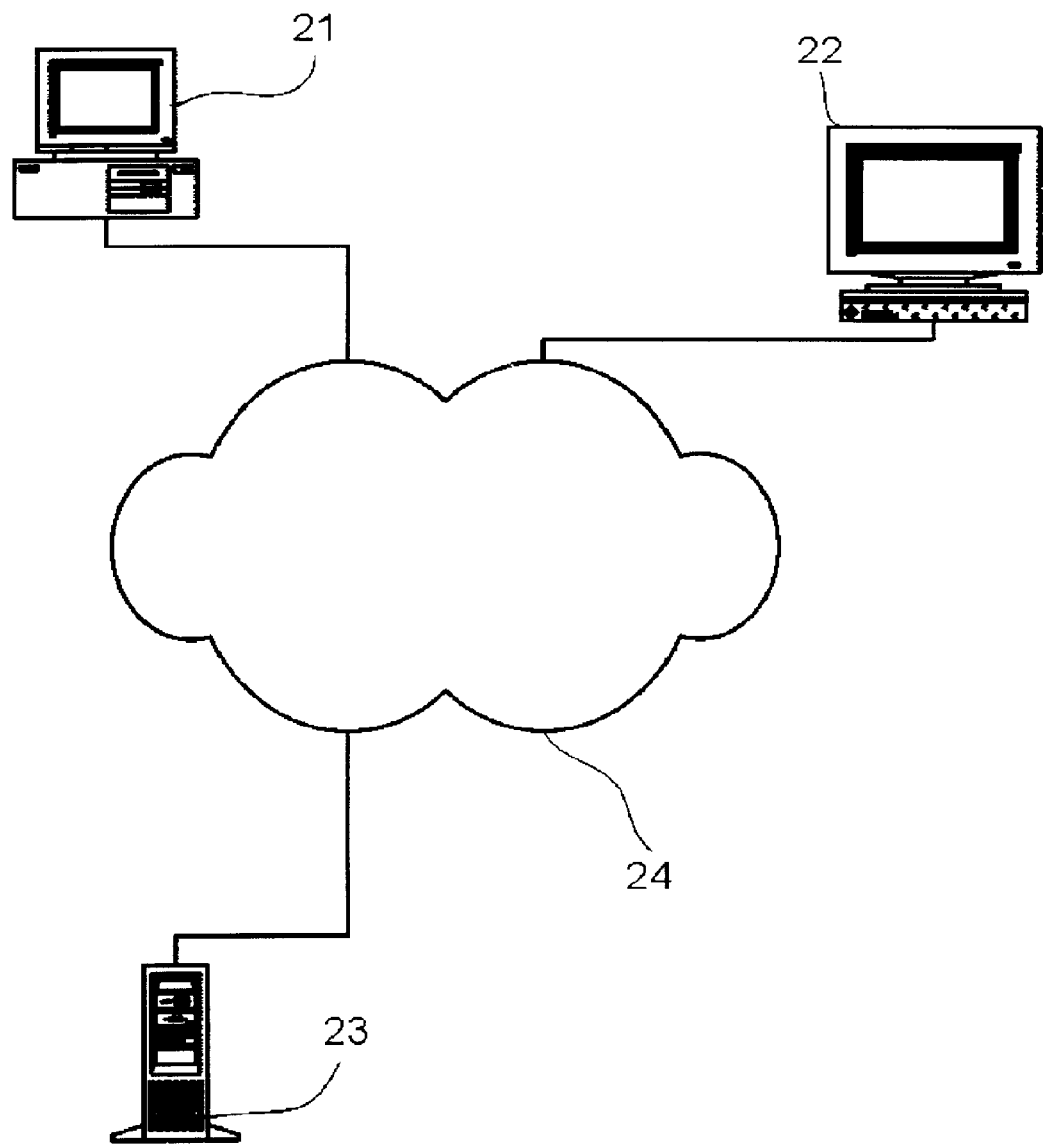
FIG. 2 is an illustrative view of a computer network environment, comprising computer systems for determining the fillrate in a supply chain or supply network according to the invention.

FIG. 2 is an illustrative view of a computer network environment, comprising computer systems or data processing systems for determining the fillrate in a supply chain or supply network according to the invention. Each computer system comprises computer processing means for processing data, storage means for storing data on a storage medium, and computer network interface means for communication with other network nodes in a computer network such as the Internet and/or an intranet.

In this embodiment of the network environment only three computer systems 21, 22, 23, representing one supplier 1, one producer 2 and one wholesaler 3, are interconnected via the Internet 24 for illustration purposes. It is however obvious that additional computer systems or even computer networks can be interconnected either via the Internet or an intranet within the scope of the invention.

Figure 3:
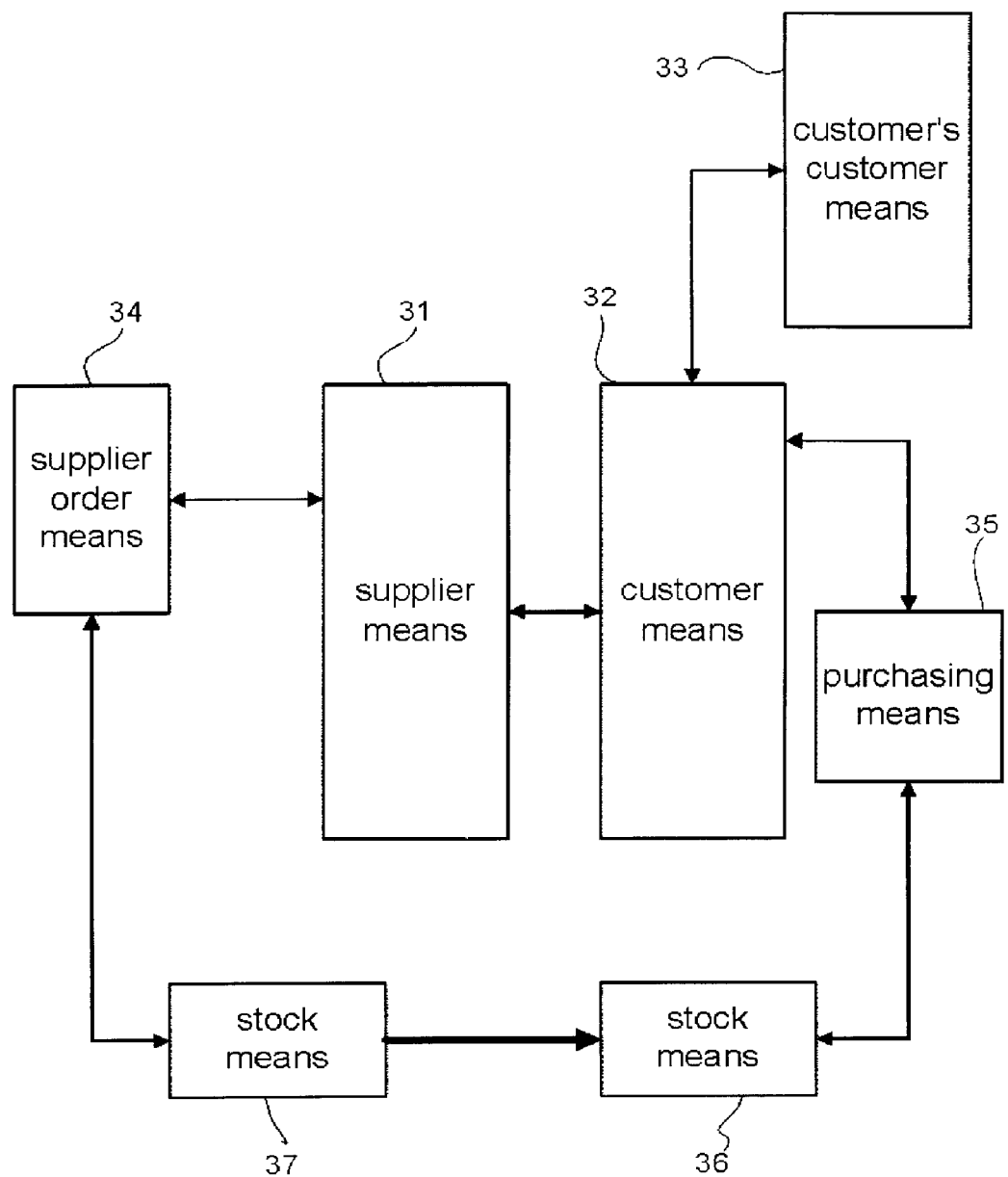
FIG. 3 is a block diagram of a first embodiment of a system for supply chain control.

A block diagram of an embodiment of a supply chain control system for the control of the flow and balance of goods and related information from point of origin to point of consumption is shown in FIG. 3.

The supply chain control system according to one embodiment of the invention comprises at least a supplier means 31, connected to at least a customer means 32, which in turn is connected to at least a customer's customer means 33. Thus, in one case the supplier means 1 corresponds to the supplier 1 in FIG. 1, the customer means 32 corresponds to the producer 2 in FIG. 1, and the customer's customer means 33 corresponds to the wholesaler 3 in FIG. 1. In another case the supplier means 31 corresponds to the producer, the customer means 32 corresponds to the wholesaler, and the customer's customer means 33 corresponds to the distributor and so on.

Hence, the supply chain system is applicable to a supply chain or network of arbitrary length, comprising several levels, as illustrated in FIG. 1.

In this embodiment, the supply chain system provides delivery automation, wherein a delivery suggestion is generated based on updated information from customers and suppliers, including the fillrate. The data exchange is time regulated according to definitions set up in a business agreement between the customer means and its supplier means and is performed in real time.

In the following description, numerous specific details, such as system blocks and the number of steps in the method etc., are provided in detail in order to give a more thorough description of the present invention. However, it will be obvious for those skilled in the art that the present invention may be practiced without these specific details. Some well-known features are not described in detail so as not to make the present invention unclear.

With reference to FIG. 3, the supplier means 31 comprises means for receiving customer product information, including customer product balance data, customer outflow demand data from the customer means 32. The product balance data is the available balance of a particular product excluding incoming and outgoing deliveries in a so called "product tank", and the outflow is the estimated flow of product units from the supplier means 31 to the customer means 32 or from the customer means 32 to the customer's customer means 33 per unit of time, for example a day. A first bases for the fillrate on a particular level in the system, for example from the supplier's viewpoint, is a so called "market tank balance" (MTB), which is determined by the following expression:

$$MTB_{CL} = PTB_{CL} + IDQ + \Sigma MTB_{CUST}$$

wherein $MTB_{CL}$ is the market tank balance on the current level, $PTB_{CL}$ is the product tank balance on the current level, IDQ is the inbound delivery quantity, and the $\Sigma MTB_{CM}$ is the sum of all customers' market tank balances. The product tank balance and market tank balance can be determined on different levels, such as at a supplier level or customer level etc, in the supply chain or network for a particular product. The product is either a single product, a group of different products, a device, or a group of different devices etc.

Hence, the supplier means 31 aggregates all the customers' market tank balances, his own product tank balance and the inbound delivery quantity on his own "incoming" pipe to his own market tank. Thus, this market tank balance is the next supplier's customer's market tank balance up in the supply chain. This aggregates the market tank balance to always include balances of all product tanks downstream in the network.

If the supplier means represents a producer or a manufacturer, i.e. the incoming product is not the same as the outgoing product or device, the market tank is partitioned through the recipe of the finished goods product to ensure transparency through the manufacturer.

The fillrate quantity $FQ_{CL}$ on a particular level in a supply chain or network according to the invention is determined by the following expression:

$$FQ_{CL}=MTB_{CL}-PB_{CL}$$

wherein $MTB_{CL}$ is the market tank balance as described above and the $PB_{CL}$ is the product balance.

Figure 6:
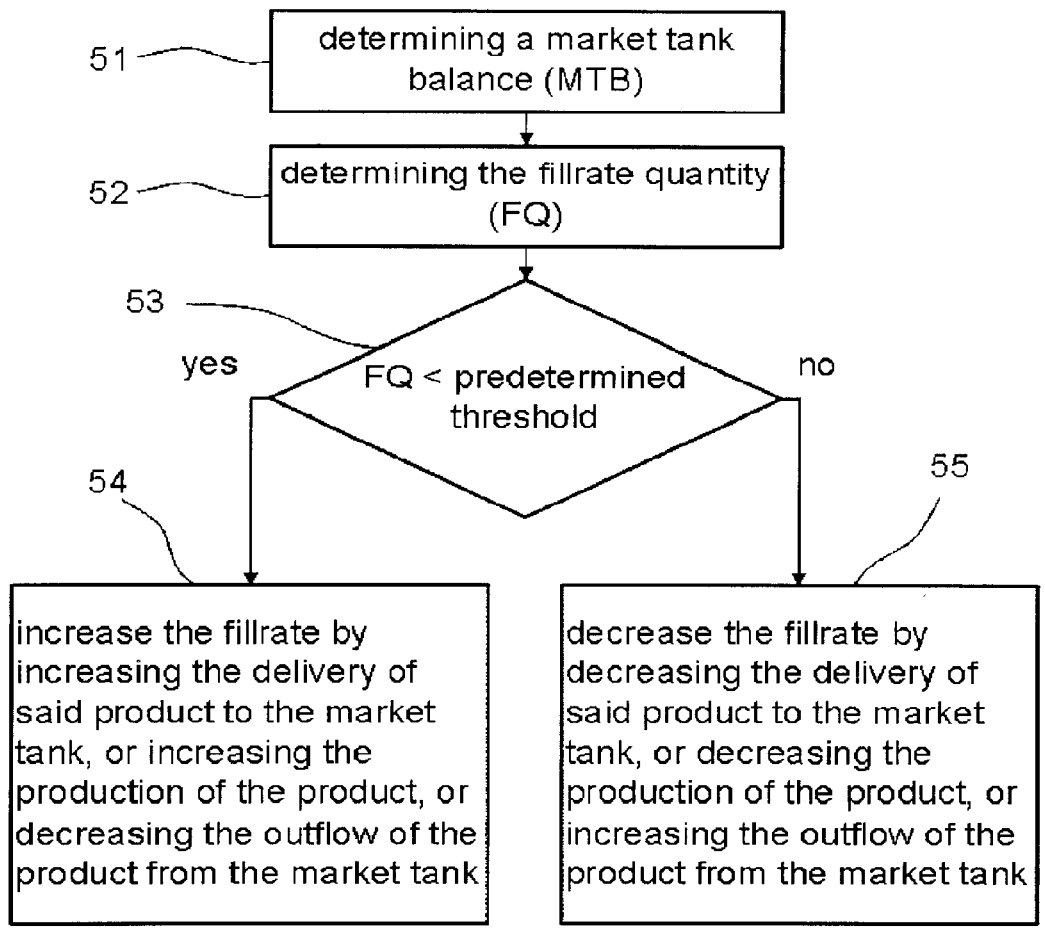
FIG. 6 is a flow-chart illustrating the method for determining the fillrate in a supply chain or supply network according to the invention, and Table 1 is a view of the properties/values of a market tank.

With reference to the flow-chart in FIG. 6, the market tank balance ($MTB_{CL}$) for said product in said supply chain or network is determined in step 51, the filtrate quantity ($FQ_{CL}$) for said product in said supply chain or network is determined in step 52 by calculating the difference between the market tank balance ($MTB_{CL}$) and a preferred balance ($PB_{CL}$) of products in the market tank. Then, it is determined in step 53 whether the filtrate quantity is lower than a predetermined threshold or not. If so, the filtrate quantity on the current level is increased by increasing the delivery amount of the product to the market tank on said level, or increasing the production of the product, or decreasing the delivery amount of the product from the market tank in step 54. However, if the filtrate quantity is higher than a predetermined threshold, reducing the filtrate quantity on said particular level by reducing the delivery amount of said product to the market tank on said current level, or reducing the production of the product, or increasing the outflow of said product from said market tank in step 55.

The method for determining the filtrate in % in a supply chain or network according to the invention involves a main step, which is divided in a number of sub_steps. The main step is defined by either of the following expressions:

$$FR_{CL}=(MTB_{CL}-PB_{CL})*2/(MTMB_{CL}-MTSB_{CL})+100\%,$$

or $$FR_{CL}=(MTB_{CL}-PB_{CL})*(MTARQ_{CL}/2)+100\%,$$

wherein the $MTB_{CL}$ is the market tank balance, the $PB_{CL}$ is the preferred balance, the $MTMB_{CL}$ is the market tank max balance, the $MTSB_{CL}$ is the market tank safety balance, and the $MTARQ_{CL}$ is a market tank average replenishment quantity, all of which are determined on the same current level.

Figure 4:
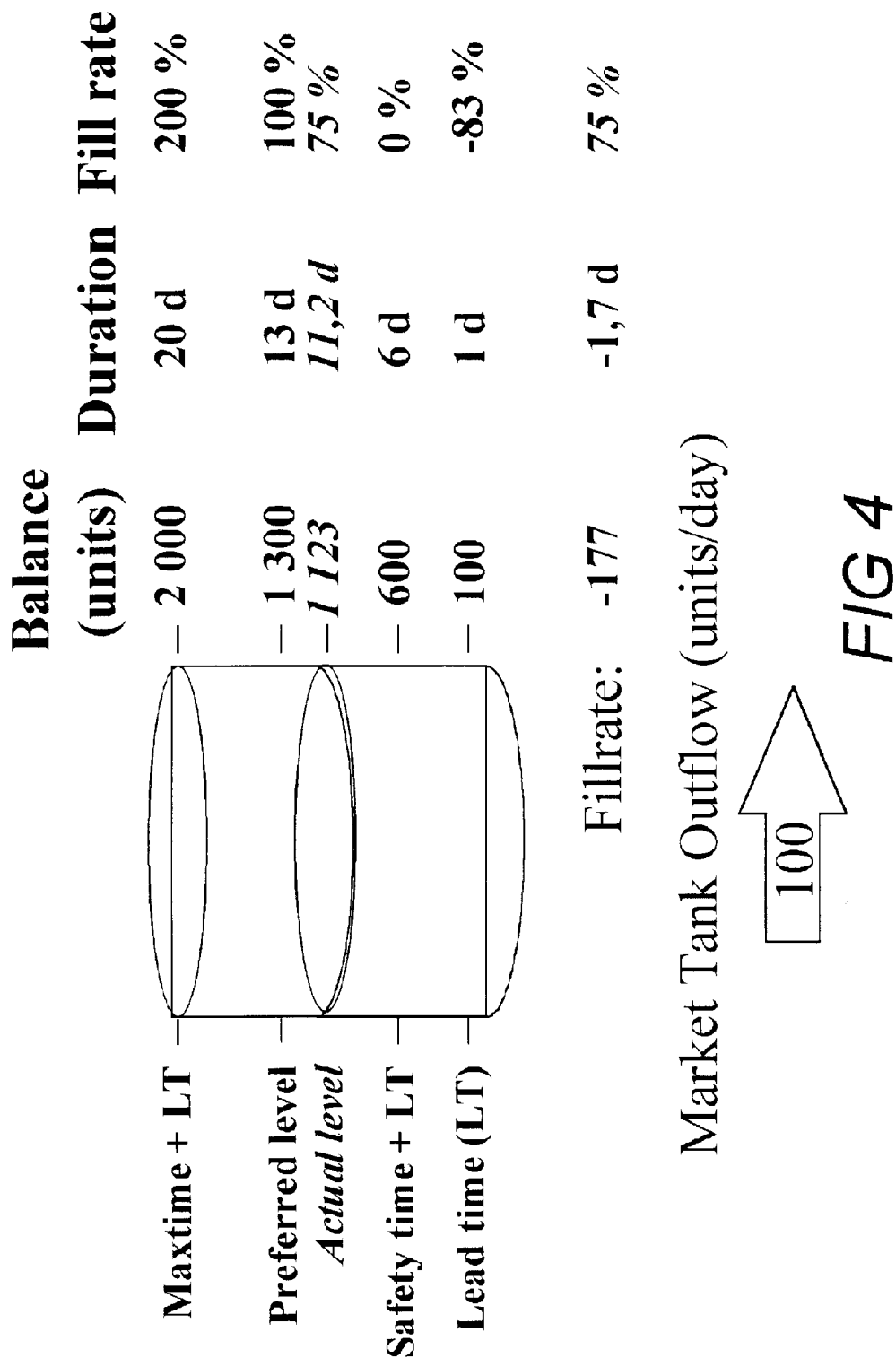
FIG. 4 is an illustrative view of a representation of a market tank.

Each parameter in the expression above can be expressed on a time bases by calculating the quotient between a parameter with a particular market tank outflow ($MTOF_{CL}$). For example, a market time duration ($MTD_{CL}$) is determined by calculating the quotient between the market tank balance ($MTB_{CL}$) and a market tank outflow ($MTOF_{CL}$) of a current level. With reference to FIG. 4, this information will give the actual "setup" of the total downstream network from any node in the supply chain or network in terms of total average lead time (LT=lead time), safety time, max time, and normal replenishment to the outflow in the end of the supply chain. Of course the current level and filtrate can also be expressed in time.

The outflow from the market tank, which is the inbound delivery to the next level down_streams in the system, can be calculated in two ways:

1. All customers to the supplier are "supplying" market tanks to the supplier and the outflow is the sum of the outflow of the customers' market tanks.
2. Some customers to the supplier are not "supplying" market tanks to the supplier and the outflow is either the sum of the outflow of the customers' market tanks or the outflow from the own product tank whichever is the greatest.

$PB_{CL}$ is the preferred balance on the current level. The preferred balance is determined by either of the following expressions:

$$PB_{CL}=(MTMB_{CL}+MTSB_{CL})/2+MTLB_{CL}$$

$$PB_{CL}=MTSB_{CL}+ARQ/2+MTLB_{CL}$$

wherein the $MTMB_{CL}$ is the market tank max balance on the current level, the $MTSB_{CL}$ is the market tank safety balance, the $MTLB_{CL}$ is the market tank lead time balance on the current level, and ARQ is the average replenishment quantity, i.e the delivery amount from a supplier to the current level.

$MTMB_{CL}$ is determined by the following expression:

$$MTMB_{CL}=\min(PTMT_{CL}*PTO_{CL};PTMB_{CL})+\Sigma MTMB_{CUST}$$

wherein $PTMT_{CL}$ is the product tank max time, $PTO_{CL}$ is the product tank outflow, $PTMB_{CL}$ product tank max balance, and $MTMB_{CUST}$ is the market tank max balance on the next level, i.e the "customer" level for the current level, downstreams in the supply chain or network.

$$MTSB_{CL}=\max(PTST_{CL}*PTO_{CL};PTSB_{CL})+\Sigma MTSB_{CUST}$$

wherein the $PTST_{CL}$ is the product tank safety time, the $PTO_{CL}$ is the product tank outflow, the $PTSB_{CL}$ is the product tank safety balance and the $MTSB_{CUST}$ is the market tank safety balance on the the "customer" level for the current level.

The market tank lead_time balance ($MTLB_{CL}$) on the current level is determined by the following expression.

$$MTLB_{CL}=\Sigma(S_{suppl}*IDLT_{CL})*PTO_{CL}+\Sigma MTLB_{CUST}$$

wherein the $S_{suppl}$ is the share for the supplier, the $IDLT_{CL}$ is the inbound delivery lead time for all suppliers to the current level, the $PTO_{CL}$ is the product tank outflow, and $MTLB_{CUST}$ is the market tank lead_time balance for the customer.

The market time max time ($MTMT_{CL}$) is the duration for the market time max balance ($MTMB_{CL}$) on the current level at the market tank outflow ($MTOF_{CL}$).

Finally, the $MTST_{CL}$ is the market tank safety time, which is the duration of a market tank safety balance ($MTSB_{CL}$) on the current level at the particular market tank outflow ($MTOF_{CL}$).

A complete view of the properties/values of a market tank required for determining the filtrate of a particular product or products in a market tank on a particular level or levels in a supply chain or network is shown in Table 1.

Although the invention has been described by way of a specific embodiment thereof it should be apparent that the present invention provides a system and method for supply chain control that fully satisfy the aims and advantages set forth above, and alternatives, modifications and variations are apparent to those skilled in the art.

For example, suppliers, customers, and customer's customer means, respectively, can be located in computer systems connected to and exchanging information and data via the Internet, or an intranet etc. In one embodiment, the method for determining a filtrate quantity ($FQ_{CL}$) according to the invention is implemented as a computer program product comprising a computer readable medium, having thereon a computer program code means for causing a computer to perform the steps of the method.

In an alternative embodiment, the method according to the invention is implemented as a computer program element comprising computer program code means to make a computer execute the steps of the method.

In an alternative embodiment of the invention the supplier order means, purchasing means and stock means are incorporated in the supplier means; and customer order means, purchasing means and stock means are incorporated in the customer means.

As mentioned above, the supply chain system according to the invention can operate as a stand alone system, in a chain as illustrated in FIG. 3 and 4, or in a network as illustrated in FIG. 1.

Figure 5:
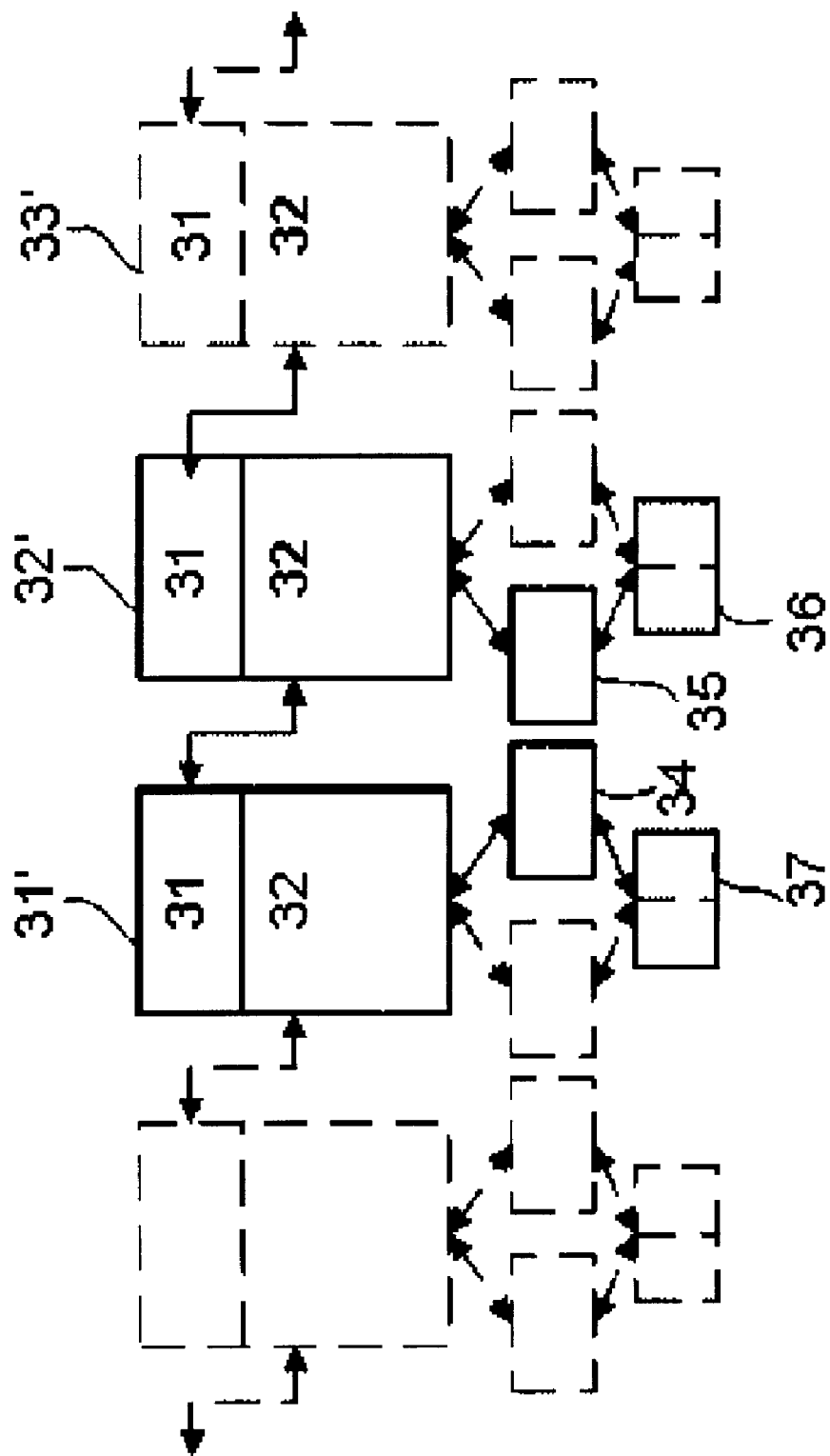
FIG. 5 is an illustrative view of a second embodiment of a block diagram of the system for supply chain control in FIG. 3.

In the embodiment of the system for supply chain control according to the invention shown in FIG. 5 each block 31', 32', and 33' comprises supplier means 31, and customer means 32. Thus, the supplier means 31 of block 31' communicates with the customer means 32 of the block 32'. The customer means 31 of block 32' then communicates with the customer means 32 of block 33'. The broken rectangles represent corresponding means on each level in the chain.

Similarly, in the embodiment of the system for supply network control according to the invention shown in FIG. 1 each node comprises supplier means 31, customer means 32, customer's customer means 33, order means 34, purchasing means 35 and stock means 36 and 37 in order to make the logistics system operate properly. For example, a distributor operates as a supplier for a shop, a customer to a producer and, a customer's customer to a supplier and, consequently, all the functions provided by the different means 31, 32 and 33 mentioned above are necessary in each node. A customer 5 comprises either the same means as the nodes 1–4 or a less complex version of the system including only customer means 32, purchasing means 35, and stock means 36.

Additionally each supplier means is connected to one or several customer means, which are connected to one or several customer's customer means. Further, the customer means operate as suppliers for the customer's customer means and each supplier may operate as a customer for one or several other suppliers.

In an alternative embodiment of the method according to the invention a raw material market tank balance ($MTB_{RM}$) in a supply chain or network is determined by calculating the following expression:

$$MTB_{RM} = PTB_{RM} + IDQ_{RM} + \Sigma MTB_{FG} * RC_{FG},$$

wherein $PTB_{RM}$ is the product tank balance of raw material, $IDQ_{RM}$ is the inbound delivery quantity, $\Sigma MTB_{FG}$ is the sum of every market tank balance of finished goods, and $RC_{FG}$ is the recipe content or the number of raw material units of one finished good product.

What is claimed is:

1. A method for determining a filtrate ($FQ_{CL}$) for a product on a current level in a supply chain or network, characterized by the steps of:

determining a market tank balance ($MTB_{CL}$) for said product in said supply chain or network by determining the market tank balance ($MTB_{CUST}$) for each customer on the customer level to the current level and calculating the market tank balance ($MTB_{CL}$) by adding together the product tank balance ($PTB_{CL}$), inbound delivery quantity ($IDQ_{CL}$), and the market tank balance ($MTB_{CUST}$) for each customer;

determining the filtrate quantity ($FQ_{CL}$) for said product in said supply chain or network by calculating the difference between the market tank balance ($MTB_{CL}$) and a preferred balance ($PB_{CL}$) of products in said market tank; and if the filtrate quantity is lower than a predetermined threshold, increasing the filtrate quantity on said current level by increasing the delivery amount of said product to the market tank on said level, or increasing the production of the product, or decreasing the delivery amount of the product from the market tank; or if the filtrate quantity is higher than a predetermined threshold, reducing the filtrate quantity on said particular level by reducing the delivery amount of said product to the market tank on said current level, or reducing the production of the product, or increasing the outflow of said product from said market tank.

2. A method according to claim 1, for determining a fillrate ($FR_{CL}$) for a product on a current level in a supply chain or network, characterized by the steps of:

determining a market tank balance ($MTB_{CL}$);

determining a preferred balance ($PB_{CL}$);

determining a market tank max balance ($MTMB_{CL}$);

determining a market tank safety balance ($MTSB_{CL}$);

determining a market tank average replenishment quantity ($MTARQ_{CL}$)

and determining the ($FR_{CL}$) filtrate by calculating either of the following expressions:

$$FR_{CL} = (MTB_{CL} - PB_{CL}) * 2 / (MTMB_{CL} - MTSB_{CL}) + 100\%,$$

$$FR_{CL} = (MTB_{CL} - PB_{CL}) * (MTARQ_{CL}/2) + 100\%.$$

3. A method according to claim 1 or 2, characterized in that the step of determining the market tank balance ($MTB_{CL}$) for said product in said supply chain or network further comprises the steps of;

determining a product tank balance ($PTB_{CL}$) on said current level; and determining an inbound delivery quantity ($IDQ_{CL}$) to the product tank on said current level.

4. A method according to claim 1, characterized in that the step of determining the preferred balance ($PB_{CL}$) for said product in said supply chain or network further comprises the steps of;

determining a market tank max balance ($MTMB_{CL}$) on said current level;

determining a market tank safety balance ($MTSB_{CL}$) on said current level;

determining a market tank lead time balance ($MTLB_{CL}$) on said current level;

determining an average replenishment quantity ($ARQ_{CL}$) on said current level;

and determining the ($PB_{CL}$) filtrate by calculating either of the following expressions:

$$PB_{CL} = (MTMB_{CL} + MTSB_{CL})/2 + MTLB_{CL}$$

$$PB_{CL} = ARQ/2 + MTSB_{CL} + MTLB_{CL}.$$

5. A method according to claim 2, characterized in that the step of determining the market tank max balance ($MTMB_{CL}$) for said product in said supply chain or network further comprises the steps of;

determining a product tank max time ($PTMT_{CL}$) on said current level;

determining a product tank outflow ($PTO_{CL}$) on said current level;

determining a product tank max balance (PTMB$_{CL}$) to the product tank on said current level;

determining the market tank max balance (MTMB$_{CUST}$) for each customer on the customer level to the current level; and determining the market tank max balance on the current level by calculating the following expression:

$$MTMB_{CL}=MIN(PTMT_{CL}*PTO_{CL};PTMB_{CL})+\Sigma MTMB_{CUST}.$$

6. A method according to claim 2, characterized in that the step of determining the market tank safety balance (MTSB$_{CL}$) for said product in said supply chain or network further comprises the steps of;

determining a product tank safety time (PTST$_{CL}$) on said current level;

determining a product tank outflow (PTO$_{CL}$) on said current level;

determining a product tank safety balance (PTSB$_{CL}$) on said current level;

determining the market tank safety balance (MTSB$_{CUST}$) for each customer on the customer level to the current level; and determining the market tank safety balance on current level by calculating the following expression:

$$MTSB_{CL}=MAX(PTST_{CL}*PTO_{CL};PTSB_{CL})+\Sigma MTSB_{CUST}.$$

7. A method according to claim 4, characterized in that the step of determining the market tank lead time balance (MTLB$_{CL}$) for said product in said supply chain or network further comprises the steps of:

determining the IDLT$_{CL}$ the inbound delivery lead time IDLT$_{CL}$ on said current level for all suppliers to the current level;

determining a supplier share (S$_{SUPPL}$) on said current level for all suppliers to said current level;

determining a product tank outflow (PTO$_{CL}$) on said current level;

determining the market tank lead time balance (MTLB$_{CUST}$) for each customer on the customer level to the current level; and determining the market tank lead time balance on current level by calculating the following expression:

$$MTLB_{CL}=\Sigma(S_{SUPPL}*IDLT_{CL})*PTO_{CL}+\Sigma MTLB_{CUST}.$$

8. A method according to claim 2, characterized in that the step of determining the market tank average replenishment quantity (MTARQ$_{CL}$) for said product in said supply chain or network further comprises the steps of;

determining a product tank average replenishment quantity (PTARQ$_{CL}$) on said current level;

determining the market tank average replenishment quantity (MTARQ$_{CUST}$) for each customer on the customer level to the current level; and calculating the market tank average replenishment quantity (MTARQ$_{CL}$) by adding together the product tank average replenishment quantity (PTARQ$_{CL}$), and the market tank average replenishment quantity (MTARQ$_{CUST}$) for each customer.

9. A method according to claim 1, characterized by the further step of determining a market time duration (MTD$_{CL}$) by calculating the quotient between the market tank balance (MTB$_{CL}$) and a market tank outflow (MTOF$_{CL}$) of said current level.

10. A method according to claim 1, characterized by the further step of determining a preferred time (PT$_{CL}$) by calculating the quotient between the product balance (PB$_{CL}$) and a market tank outflow (MTOF$_{CL}$) on the current level.

11. A method according to claim 1, characterized by the further step of determining a market tank max time (MTMT$_{CL}$) by calculating the quotient between a market time max balance (MTMB$_{CL}$) and a market tank outflow (MTOF$_{CL}$) on the current level.

12. A method according to claim 2, characterized by the further step of determining a market tank safety time (MTST$_{CL}$) by calculating the quotient between the market tank safety balance (MTSB$_{CL}$) and a market tank outflow (MTOF$_{CL}$) on the current level.

13. A method according to claim 1, characterized by the further step of determining a filtrate time (FRT$_{CL}$) by calculating the quotient between the fill rate quantity (FQ$_{CL}$) and a market tank outflow (MTOF$_{CL}$) on the current level.

14. A method for determining a raw material market tank balance (MTB$_{RM}$) in a supply chain or network, characterized by the steps of:

determining a raw material product tank balance (PTB$_{RM}$), determining a raw material inbound delivery quantity (IDQ$_{RM}$), determining a sum of every market tank balance of finished goods in the supply chain or network ($\Sigma$MTB$_{FG}$), determining the number of raw material units of one finished good product (RC$_{FG}$), and determining the raw material market tank balance (MTB$_{RM}$) by calculating the following expression:

$$MTB_{RM}=PTB_{RM}+IDQ_{RM}+\Sigma MTB_{FG}*RC_{FG}.$$

15. A method for determining a finished goods market tank balance (MTB$_{FG}$) in a supply chain or network, characterized by the steps of:

determining a product tank balance of finished goods (PTB$_{FG}$), determining works in progress (WP), determining the sum of market tank balance on the customer level (MTB$_{CL}$), for each customer on the customer level to the current level; and determining the finished goods market tank balance (MTB$_{FG}$) by calculating the following expression:

$$MTB_{FG}=PTB_{FG}+WP+\Sigma MTB_{CUST}.$$

16. A computer program product comprising a computer readable medium, having thereon a computer program code means for causing a computer to perform the steps of any of the claim 1, 14, or–15.

17. A computer program element comprising computer program code means to make a computer execute the steps of any of the claim 1, 14, or–15.

18. A data processing system for determining a filtrate quantity (FQ$_{CL}$) for a product on a current level in a supply chain or network, characterized by the steps of:

means for determining a market tank balance (MTB$_{CL}$) for said product in said supply chain or network;

means for determining the filtrate quantity for said product in said supply chain or network by calculating the difference between the market tank balance (MTB$_{CL}$) and a preferred balance (PB$_{CL}$) of products in said market tank; and means for increasing the fillrate quantity on said current level by increasing the delivery amount of said product to the market tank on said level, or increasing the production of the product, or decreasing the delivery amount of the product from the market tank, if the fillrate quantity is lower than a predetermined threshold; and means for reducing the fillrate quantity on said particular level by reducing the delivery amount of said product to the market tank on said current level, or reducing the production of the product, or increasing the outflow of said product from said market tank, if the fillrate quantity is higher than a predetermined threshold.

19. A system according to claim 18, characterized by means for determining a product tank balance (PTB$_{CL}$) on said current level;

means for determining an inbound delivery quantity (IDQ$_{CL}$) to the product tank on said current level;

means for determining the market tank balance (MTB$_{CUST}$) for each customer on the customer level to the current level; and means for determining the market tank balance (MTB$_{CL}$) by calculating the sum of the product tank balance (PTB$_{CL}$), inbound delivery quantity (IDQ$_{CL}$), and the market tank balance (MTB$_{CUST}$) for each customer.

20. A data processing system for determining a filtrate (FR$_{CL}$) for a product on a current level in a supply chain or network, characterized by means for determining a market tank balance (MTB$_{CL}$);

means for determining a preferred balance (PB$_{CL}$);

means for determining a market tank max balance (MTMB$_{CL}$);

means for determining a market tank safety balance (MTSB$_{CL}$);

means for determining the (FR$_{CL}$) fillrate by calculating the following expression:

$$FR_{CL}=(MTB_{CL}-PB_{CL})*2/(MTMB_{CL}-MTSB_{CL})+100\%,$$

means for increasing the fillrate quantity on said current level by increasing the delivery amount of said product to the market tank on said level, or increasing the production of the product, or decreasing the delivery amount of the product from the market tank, if the fillrate quantity is lower than a predetermined threshold; and means for reducing the fillrate quantity on said particular level by reducing the delivery amount of said product to the market tank on said current level, or reducing the production of the product, or increasing the outflow of said product from said market tank, if the fillrate quantity is higher than a predetermined threshold.

* * * * *